(No Model.)
T. KIRBY & R. SHEA.
COMBINED HAY RAKE AND LOADER.
No. 319,267. Patented June 2, 1885.
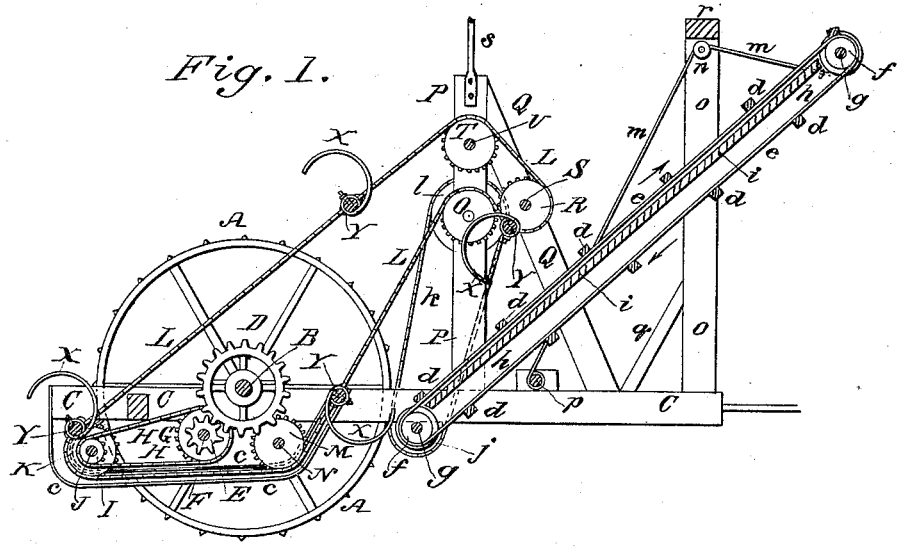

UNITED STATES PATENT OFFICE.

THOMAS KIRBY AND ROBERT SHEA, OF EMMETSBURG, IOWA.

COMBINED HAY RAKE AND LOADER.

SPECIFICATION forming part of Letters Patent No. 319,267, dated June 2, 1885.

Application filed December 4, 1883. (No model.)

*To all whom it may concern:*

Be it known that we, THOMAS KIRBY and ROBERT SHEA, both of Emmetsburg, in the county of Palo Alto and State of Iowa, have invented a new and useful Improvement in a Combined Hay Rake and Loader, of which the following is a full, clear, and exact description.

Reference is to be had to the accompanying drawings, forming part of this specification, in which similar letters of reference indicate corresponding parts in all the figures.

Figure 1 is a sectional side elevation of our improvement. Fig. 2 is a plan view of the same. Fig. 3 is a perspective view of a rake-tooth, a pair of guide-wheels, a part of a tooth-bar, and a part of a rake-chain. Fig. 4 is a side elevation of the upper part of a rake-post and its brace, and showing the chain-wheels and a part of a rake-chain.

The object of this invention is to facilitate the gathering and loading of hay.

The invention consists in a hay rake and loader, constructed as will be hereinafter fully described, and specifically set forth in the claim.

A represents the drive-wheels, the axle B of which revolves in bearings attached to the side bars of the base-frame C.

To the axle B are attached two gear-wheels, D, the teeth of which mesh into the teeth of pinions E, attached to the shaft F. The shaft F revolves in bearings attached to the side bars of the base-frame C, and to it are attached two sprocket-wheels G, around which pass two endless chains, H. The chains H also pass around smaller sprocket-wheels I, attached to the shaft J, which revolves in bearings attached to the lower sides of the rear ends of the side bars of the base-frame C.

To the shaft J are also attached two larger sprocket-wheels K, around which pass two endless chains, L. The chains L pass around two sprocket-wheels M, attached to the shaft N, which revolves in bearings attached to the lower side of the side bars of the base-frame C. The shafts J N are placed at the same level, so that the parts of the chains L passing from the sprocket-wheels K to the sprocket-wheels M will be horizontal, and thus parallel with the ground.

From the sprocket-wheels M the chains L incline upward and pass over the sprocket-wheels O, journaled to the posts P, the lower ends of which are attached to the side bars of the base-frame C, and which are strengthened against the pull of the chains L by the braces Q, attached at their upper ends to the upper parts of the posts P and at their lower ends to the side bars of the base-frame C.

From the chain-wheels O the chains L pass below and around the sprocket-wheels R, attached to the shaft S, which revolves in bearings formed in or attached to the braces Q.

From the sprocket-wheels R the chains L pass over the sprocket-wheels T, and pass thence to the sprocket-wheels K. The sprocket-wheels T are attached to the shaft U, which revolves in bearings V, placed in slots in the upper ends of the posts P, and adjustably secured in place by bolts W, so that the chain-wheels T can be readily raised and lowered to tighten and slacken the endless chains L, as may be required.

X are the rake-teeth, which are curved, and the upper ends of which are coiled around and are attached to the bars Y, four (more or less) of which are used, and which are placed at equal distances apart. The ends of the rake-bars Y are attached to the lugs or plates Z, formed upon or attached to the inner sides of links of the chains L, and to the outer sides of the said links are attached or upon them are formed lugs or plates *a*, to which or to cross-bars attached to or formed upon them are pivoted pairs of small rollers *b*, as shown in Fig. 3. As the rake-heads Y are carried around the sprocket-wheels K by the endless chains L the rollers *b* pass between the horizontal guide-bars *c*, by which the said rake-heads are held down to the ground, and in proper position to collect hay. As the rake-heads X Y pass up from the sprocket-wheels M the upward inclination of the chains L throws the points of the curved rake-teeth upward, as shown in Fig. 1, so as to prevent the hay from falling off the said rake-teeth. As the rake-heads Y pass down from the upper sides of the sprocket-wheels O to the lower sides of the sprocket-wheels R the inclination of the chains L throws the points of the rake-teeth downward and discharges the hay upon the endless apron of the elevator.

The endless apron of the elevator is formed by attaching cross-slats $d$ to endless belts $e$, so as to prevent the hay from slipping back while being carried up the elevator. The endless belts $e$ pass around pulleys or rollers $f$, attached to shafts $g$, journaled to the upper and lower ends of the side bars, $h$, which are connected by a stationary apron or bottom, $i$, up which the hay slides while being elevated, the side bars, $h$, and the bottom $i$ forming the elevator-frame.

The journals of the lower roller-shaft, $g$, revolve in bearings attached to the side bars of the base-frame C, and thus hinge the elevator-frame $h\, i$ to the said base-frame.

To the ends of the lower roller-shaft, $g$, are attached sprocket-wheels $j$, around which pass endless chains $k$. The chains $k$ also pass around sprocket-wheels $l$, attached to the outer ends of the journals of the sprocket-wheels O, so that the elevator will be driven from the mechanism that drives the endless chain of rakes.

To the upper ends of the side bars, $h$, of the elevator are attached the ends of ropes or chains $m$, which pass over pulleys $n$, pivoted to the upper parts of the posts $o$, and pass thence to and are wound upon a shaft, $p$, which revolves in bearings attached to the side bars of the base-frame C, so that the upper end of the elevator can be raised and lowered as the height of the load may require. The shaft $p$ is designed to be provided with a crank for operating it, and a ratchet-wheel and pawl for holding it in position, which crank, ratchet-wheel, and pawl are not shown in the drawings, as there is nothing new in their construction and operation. The lower ends of the posts $o$ are attached to the forward ends of the side bars of the base-frame C, and the said posts are strengthened in position by braces $q$, attached to them and to the said side bars. The upper ends of the posts $o$ are connected by a cross-bar, $r$, and the upper ends of the posts P are connected by an arched bar, $s$, as indicated in Fig. 1.

The mechanism may be connected with the rear axle of the wagon upon which the hay is to be loaded, or it may be drawn by a team at the side of the said wagon.

Having thus described our invention, we claim as new and desire to secure by Letters Patent—

In a combination hay rake and loader, the combination, with the wheels and axle A B, the frame C, and the posts and braces P Q, of the gear-wheel D and pinion E, the sprocket-wheels G I K M O R T, the endless chains H L, and the rake-heads Y, substantially as herein shown and described, whereby the hay is collected and delivered upon an elevator, as set forth.

THOMAS KIRBY.
      ROBERT SHEA.

Witnesses:
 LE ROY GROUT,
 W. L. LINDERMAN.